(12) United States Patent
Cremerius et al.

(10) Patent No.: US 7,758,431 B2
(45) Date of Patent: Jul. 20, 2010

(54) QUENCHED AND TEMPERED JOINT CAGE

(75) Inventors: Rolf Cremerius, St. Augustin (DE); Rainer Adolfs, Bergneustadt (DE)

(73) Assignee: GKN Driveline International GmbH, Lohmar (DE)

( * ) Notice: Subject to any disclaimer, the term of this patent is extended or adjusted under 35 U.S.C. 154(b) by 91 days.

(21) Appl. No.: 10/562,768

(22) PCT Filed: Sep. 10, 2004

(86) PCT No.: PCT/EP2004/010118

§ 371 (c)(1), (2), (4) Date: Nov. 7, 2008

(87) PCT Pub. No.: WO2006/027011

PCT Pub. Date: Mar. 16, 2006

(65) Prior Publication Data

US 2009/0060406 A1 Mar. 5, 2009

(51) Int. Cl. *F16D 3/00* (2006.01)

(52) U.S. Cl. ............. 464/145; 464/906

(58) Field of Classification Search ........ 464/145, 464/146, 906

See application file for complete search history.

(56) References Cited

U.S. PATENT DOCUMENTS

| | | | | |
|---|---|---|---|---|
| 3,887,248 | A * | 6/1975 | Riegler | 384/206 |
| 4,020,312 | A * | 4/1977 | Araki et al. | 219/61 |
| 6,270,419 | B1 * | 8/2001 | Jacob | 464/145 |
| 6,390,924 | B1 | 5/2002 | Yoshida et al. | |
| 6,439,072 | B1 * | 8/2002 | Kajita et al. | 74/89.23 |
| 2003/0091256 | A1 * | 5/2003 | Grell et al. | 384/575 |
| 2006/0150417 | A1 * | 7/2006 | Obayashi et al. | 29/898.064 |

FOREIGN PATENT DOCUMENTS

DE 43 30 779 A1 3/1995

* cited by examiner

*Primary Examiner*—Aaron M Dunwoody
(74) *Attorney, Agent, or Firm*—Rader, Fishman & Grauer PLLC

(57) ABSTRACT

A cage having a plurality of cutouts for receiving rolling bodies of a joint, wherein the cage comprises a quenched and tempered steel, and the entire cage has a substantially uniform ductility over its cross section without surface hardening.

4 Claims, 3 Drawing Sheets

QUENCHED AND TEMPERED JOINT CAGE

TECHNICAL FIELD

The invention relates to a cage having a plurality of cutouts for receiving rolling bodies of a joint. A process for producing a cage of this type is also proposed.

The invention relates in particular to cages for constant-velocity rotary ball joints, as are used for example in the automotive industry. These joints have a joint outer part and a joint inner part, in which a plurality of substantially longitudinally running ball races are provided. The balls are fitted between the joint outer part and the joint inner part for the purpose of torque transmission, the positioning of the balls being ensured by a cage arranged between the joint outer part and the joint inner part. The cage has a plurality of cage windows for the balls, so that their movement in the axial direction is restricted.

With regard to the various types of joint, the invention relates in particular to cages for the following joints:

Rzeppa joints, in which the direct control of the balls onto the angle-bisector plane is effected by meridionally running ball races with longitudinally offset centre points of the races of the joint inner part and joint outer part.

Undercut-free UF joints, which follow substantially the same principle, the ball races are designed to be undercut-free as seen in the axial direction.

What are known as DO joints, in which spherical guide surfaces with axially offset centres of curvature on the inner and outer sides are provided on the cage, so that in the event of joint inclination, direct control of the cage and therefore indirect control of the balls onto the angle-bisector plane takes place. Joints of this type are designed with curved ball guideways as fixed joints and with ball guideways which run in a straight line as axially displaceable joints.

Finally, reference should also be made here by way of example to what are known as VL joints, which have races which are at least partially associated with one another in the joint outer part and joint inner part and do not run strictly in the longitudinal direction, but rather form an angle with one another and thereby effect direct control of the balls onto the angle-bisector plane and onto half the displacement path.

In all these known joints, the cages are permanently or at least from time to time in sliding contact with the surfaces of the inner and/or outer part of the joint located between the ball races. For reasons of wear, it is in this respect necessary for all the sliding surfaces on the joint outer part, the joint inner part and on the cage to be hardened.

With regard to the cage, there has hitherto been provision for hardening to be carried out in the region close to the surface, in order in particular to avoid wear phenomena caused by friction with the joint outer part and/or joint inner part. In particular in the automotive industry, it is at present being recognized that ever greater forces or torques need to be transmitted using these joints. This imposes particular demands in particular if the joint is not subject to purely axial stresses, but rather the force or torque is transmitted with an inclination angle. This is related in particular to the transmission of force from the balls to the cage. A ball is generally held in position by means of three contact points, namely one with the inner part, another one with the outer part and a third with the cage. As the inclination angle increases, the race forces acting on the ball increase, and these forces then have to be compensated for to a greater extent by means of the cage. This resultant cage force ultimately leads to torque limiting of the joint at relatively high inclination angles. On account of ever increasing market demands for increasing torques, this fact means that ever larger joints have been required.

SUMMARY

Working on this basis, it is an object of the present invention to provide a cage for a joint which at least partially alleviates the technical problems which are known in connection with the prior art. In particular, the cage is to be able to permanently withstand the changing requirements in particular in the automotive industry; very compact joints should advantageously be made available. Moreover, it is an object of the invention to provide a simple process, which can be successfully integrated in series production, for producing a corresponding cage.

The cage according to the invention has a plurality of cutouts for receiving rolling bodies of a joint, and the entire cage has a substantially uniform ductility. This is to be understood as meaning in particular that the surface hardening which has hitherto always been carried out on the cage is no longer performed. Whereas hitherto the entire surface has been hardened, for example by case hardening to produce the hardest possible surface with a ductile core, it is now proposed that the entire cage has the same ductility over its cross section. Accordingly, therefore, there are in particular no significant differences in hardness, differences in microstructure, etc. detectable over the cross section or in the direction of the circumference of the cage. Tests have shown that with a cage of this type it is possible to absorb static forces which are more than 50% higher compared to the surface-hardened or case-hardened cages. If a cage of this type is now fitted into a joint, it is possible to permanently transmit static torques which are up to 30% higher.

The term "ductility" is to be understood in particular as meaning the property of the material to be permanently deformed under the action of external forces, i.e. the property of tending to be plastically deformed rather than fracturing. The degree of ductility generally also depends on the temperature, the assumption here being room temperature.

According to a preferred configuration of the cage, the latter has a hardness in the range from 500 to 650 HV [Vickers hardness], in particular in a range from for example 550 HV to 600 HV. In the Vickers hardness test, a regular, four-sided test pyramid as penetrator is placed under a static load onto the surface of the material to be tested and impressed for a defined time. The determination of the Vickers hardness (HV) results from the force and the permanent indentation area, which means that elastic deformations are not taken into account. This method is well known and consequently a more detailed description is not required at this point.

With the configuration of the cage proposed here, the Vickers test method can be carried out at any point in the cross section of the cage and will result in hardness ranges which substantially correspond to those in the surface region or in the near-surface region of the cage. In particular, the deviation is in a range of less than 15%, preferably less than 10%, of the hardness at the surface of the cage. The hardness range of 500 to 650 HV given here is selected in particular for a cage of this type to be used for a joint in the automotive industry.

Furthermore, it is also proposed that the cage comprises a quenched and tempered steel. This is to be understood as meaning in particular that the cage has been produced entirely from a steel which, in terms of its heat treatment for setting certain materials properties, has first of all been fully hardened and then tempered, in order to have the positive properties described above. Examples of suitable steels are unalloyed quenched and tempered steels with a carbon content of from 0.35% to 0.6%.

Whereas steels which can be quenched and tempered may fundamentally have a carbon content from for example 0.3% to 0.7%, according to a further variant of the invention, it is proposed that the cage comprises a steel with a carbon content in the range from 0.3% to 0.5%, in particular in a range from 0.43% to 0.5%. In view of the fact that the possible increase in hardness during hardening is also determined to a critical degree by the carbon content, it is at first glance surprising that a steel with a relatively low carbon content is proposed here. However, extensive tests have shown that with regard to this particular component specifically quenched and tempered steels with a slightly lower carbon content and lower temper hardnesses can withstand higher static loads than quenched and tempered steels with higher C contents. Furthermore, cages made from quenched and tempered steels with lower C contents can be heat-treated in a more reliable way, ensuring a constant quality of the cages in series production.

According to a preferred configuration of the cage, the latter comprises a steel which includes at least boron as alloying element. It is preferable for the boron content to be in the range from 0.0001% to 0.0015%, in particular in the range from 0.0001% to 0.001%. The presence of boron means that the steel is not only eminently suitable in terms of its formability and hardenability, but also is particularly good at allowing subregions to be sheared out during cutting. This is of particular relevance when producing the cage, since the cutouts are generally punched out. It is very particularly preferable to use a steel with the designation 45B2M (comprising: C: 0.45-0.5%, Mn: 0.5-0.6%, Si: max. 0.1%; P: max. 0.015%, S: max. 0.025%, Al: 0.02-0.04%, Cr: 0.2-0.3%, Mo: max. 0.01%, Ni: max. 0.025%, Cu: max. 0.015%, Ti: 0.003-0.005%, B: 0.0001-0.0005%, N: max. 0.012%) or a similar material for this purpose.

A further aspect of the invention describes a process for producing a cage having a plurality of cutouts for receiving rolling bodies of a joint. This process comprises at least the following steps:

forming a closed base body;
cutting out a plurality of cutouts;
fully hardening the cage;
tempering the cage.

With regard to the first process step listed above, it should be noted that the term "forming" encompasses both primary forming production processes and deforming production processes. It is preferable for the base body to be produced by being cut from a semi-finished product which resembles a tube.

A plurality of cutouts are generally "cut out" by using a cutting tool with material being removed mechanically from the base body. In particular the punching process is recommended for this purpose. In certain applications, it may also be expedient for the cutting-out to be carried out by means of high-energy beams. In addition, it is possible to carry out further processes for influencing the shape or surface contour, such as for example material-removing machining of the base body in the unhardened soft state by means of turning, drilling and/or milling.

According to the invention, it is now proposed that the cage be fully hardened. For this purpose, the cage is heated approximately to temperatures from 800° C. to 1000° C. and then quenched to a temperature of approx. 20° C. to 60° C. The quenching takes place over a period of less than 10 seconds, in particular over a period from 0.5 to 4 seconds. The quenching rate must not be too high, since otherwise hardening cracks occur. The quenching must be as homogeneous as possible to ensure that the distortion is minimized. After the full hardening, the cage is martensitic all the way through and is accordingly extremely brittle and at risk of fracture. To avoid the formation of cracks as a result of internal stresses, the cages should be tempered as quickly as possible.

After the full hardening, the cage is heat-treated again. It is preferable for the tempering temperature to be in a range from 150° C. to 250° C. and to last, for example, for 5 minutes to 90 minutes, depending on the tempering method applied, but preferably at most 10 minutes. The tempering in this case has the function of improving the ductility properties of the cage compared to the hardened state; it is generally necessary to accept a drop in strength. The internal stresses which are present in the quench-hardened material are reduced down to a certain level. The execution of the tempering treatment—in particular the temperature and tempering duration—is dependent both on the chemical composition and on the microstructural state achieved by hardening. In general, however, as the tempering temperature rises, the strength drops while the elongation and reduction of area after fracture increase.

The tempering may take place directly in the hardening station or in a subsequent tempering station (e.g. with separate inductive, electrical or gas-operated continuous furnace or chamber furnace). In this context, it is preferable to use a process which allows treatment of individual parts and can therefore be integrated in the manufacturing line. The tempering can in this case advantageously be carried out in a small space and within a short time (the manufacturing cycle time if possible). The total tempering time required is determined from the component heating time required to reach the desired tempering temperatures and the holding time. The shorter the tempering time or holding time, the higher the tempering temperature required. For tempering operations carried out within seconds, which may be required for this process to be integrated in a hardening installation, it is generally necessary to use "high-temperature tempers" (tempering temperatures above standard long-time tempers in the furnace lasting approx. 0.5 to 1.5 hour). However, this form of tempering often entails the risk of overheating, resulting in cages which are too soft, which is difficult to recognize. In the case of a preferred temper in an inductive continuous furnace, high-risk "high-temperature tempering" is not required, since with this tempering standard-temperature tempering in the range from 1 to 5 minutes is possible, the yield preferably corresponding to that of the production line. Series of tests have revealed that the temper hardness of the fully hardened cages has to be lower and within tighter tolerances compared to those of case-hardened cages, preferably 57 HRC to 60 HRC, in order to obtain a configuration of a joint which is able to function in an appropriate way in the long term for the application area described here.

According to another configuration of the process, the step of fully hardening comprises at least one of the following means for heating the cage: inductive heating, heating by an energy beam, heating by means of a continuous furnace or chamber furnace. Depending on whether the cages are heat-treated individually or in combination, it is possible, for example, to use the following methods: a) Heating of individual cages by induction in the single shot process by an energy beam (e.g. laser, electron beam)

by electrical resistance b) Cage heating in a continuous furnace
by means of induction, electrical or gas continuous furnaces c) Heating of the cages in a chamber furnace
by means of induction, electrical, gas or plasma chamber furnaces.

In this context, inductive single-shot hardening of individually heated cages integrated in the manufacturing process is particularly preferred. Moreover, energy beams, such as for example a laser beam or an electron beam, can be used in particular for partial hardening of the cage.

With regard to the quenching of the cage, it is possible to distinguish between the following methods: a) Quenching of the individual cage:
by quenching showers
surrounding the individual part or by axial advance
axially on the individual part or by horizontal advance
laterally on the individual part or by horizontal advance
in a bath or whirlpool
at least in free fall b) Quenching a batch of a plurality of cages:
a. by axial immersion in an oil or salt bath
b. by liquid showers
c. by gas quenching.

In this context, annular shower quenching of an individual part integrated in the hardening machine is particularly preferred.

The hardening temperature, also known as the austenitizing temperature, in the case of hypoeutectoid steels is approx. 50° C. above what is known as the $Ac_3$ line of the corresponding iron-carbon diagram. The hardening of the steel is to be understood in general terms as meaning the transformation of the γ solid solution to the martensite hardening structure. The transformation to ferrite, perlite and bainite is in this case suppressed. The cooling rate must be above the critical cooling rate, in order in particular to avoid the formation of these intermediate microstructures.

According to an advantageous configuration of the process, the tempering leads to a hardness of the cage in the range from 500 to 600 HV [hardness determined by the Vickers test method]. The term "tempering" is to be understood as meaning heating of a component to a temperature below what is known as the $Ac_i$ line in the iron-carbon diagram (after prior hardening) and holding at this temperature with subsequent cooling. In the first tempering stage (100 to 180° C.), ultrafine $Fe_{2.4}C$ particles (ε carbides) are precipitated, and the dispersion hardening increases at the expense of the supersaturation strengthening (tetragonal martensite changes into cubic martensite). Above 200° C., the ε carbides become unstable and on account of carbon diffusion out of the residual austenite undergo a transformation to $Fe_3C$. This leads to carbon depletion in the austenite. To achieve the abovementioned hardness of the cage, it is possible, for example, for steel 45B2M to be tempered at temperatures of approx. 190° C., with the material being cooled again after a holding time of from approximately 40 seconds to 120 minutes depending on the tempering method.

During the tempering, at least one of the following means can be used to heat the cage: a) temper heating of individual cages:
by induction using the single shot method (generally tempering in the range from 20-60 seconds)
by electrical resistance
in a warm bath (generally oils or salts)

b) temper heating in a continuous furnace
by means of induction, electrical or gas continuous furnaces c) temper heating of the cages in a chamber furnace
by means of induction, electrical, gas or plasma chamber furnaces Depending on the hardening method, the tempering of the cage is usually carried out at least by means of:
immersion in a warm liquid (in particular in the case of individual part heating), or
passage through at least one continuous furnace or chamber furnace (in particular when heating a plurality of parts simultaneously)

Finally, it is particularly advantageous for a joint comprising an outer part, an inner part, a plurality of rolling bodies and a cage to be configured in such a way that the cage is produced in the abovementioned design or using the process according to the invention described above. This results in significantly improved load-bearing properties also with regard to the joint, so that even high static forces or torques can be transmitted at large inclination angles. The increase in the static breaking strength of the cage in this case leads directly to an improvement in the joint properties.

This becomes particularly noticeable if the joint provides an inclination angle for a shaft of greater than 20° [degrees]. In particular, the maximum possible inclination angle of the joint is in a range from 30° to over 50°. With such extreme inclinations, significantly higher forces act on the cage as a result of axial stressing from the rolling bodies. In this context, tests have shown that in particular under these extreme stresses, the fully hardened, quenched and tempered cage has a significantly improved static breaking strength. Tests have shown that the joint according to the invention has a cage breaking strength which is increased by up to 50% compared to known joints and also allows the maximum quasi-static torque which can be transmitted at a 450 inclination angle to be increased by up to 30%.

Vehicles may be mentioned as a particularly preferred application area for joints of this type. This is to be understood as meaning in particular passenger cars, lorries, etc. Further technical application areas include, for example, wind power plants or other drive trains in which rigid transmission of torques or forces is not possible.

The invention and the technical background are explained in more detail below with reference to the figures. It should be noted that the figures show particularly preferred exemplary embodiments of the invention, without the invention being restricted to these embodiments. In the drawing:

DETAILED DESCRIPTION

Figure 1:
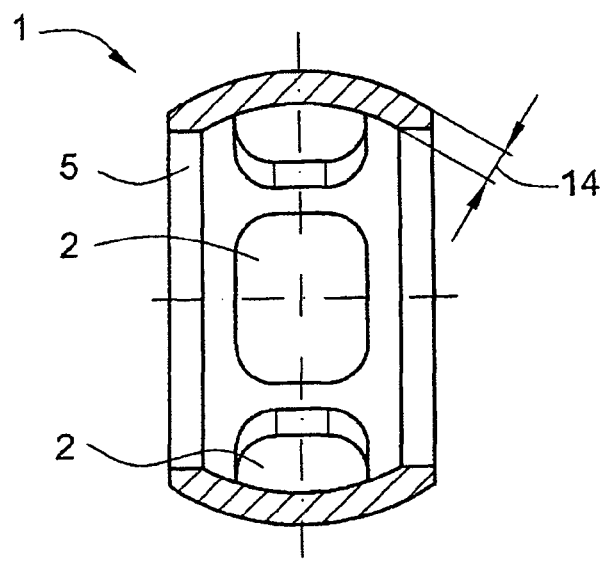
FIG. 1 shows a diagrammatic cross section through a cage.

FIG. 1 shows a diagrammtic cross section through a variant embodiment of a cage 1. The cage 1 comprises a base body 5 which has a cylindrical configuration with circumferential surfaces which curve convexly outwards. Base bodies 5 of this type usually have a material thickness 14 in the range from 2.5 to 6.0 mm. In the variant embodiment of the cage 1 illustrated, a plurality of cutouts 2 are provided over the circumference. These cutouts are used to receive rolling bodies of a joint. Here, the cage has six (6) cutouts 2, although there may also be four (4) or eight (8). In general, each cutout 2 is designed in a shape which is such that in each case one rolling body can move sufficiently therein under load. It is equally possible for a plurality of rolling bodies to be positioned in a cutout 2. A different structure of the cage 1 may then occur.

Figure 2:
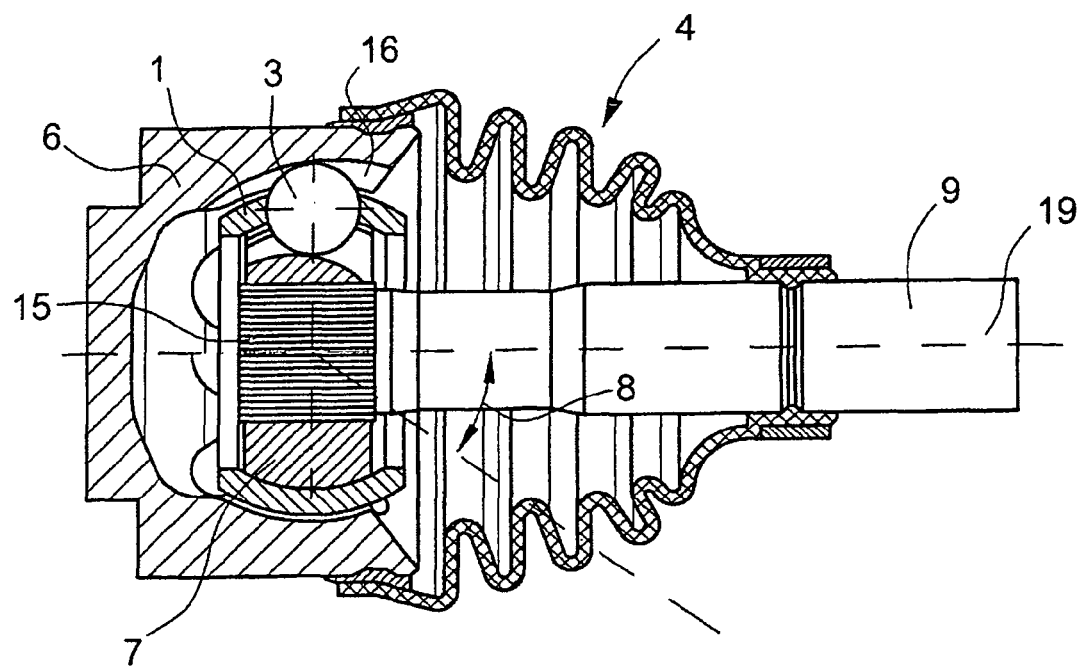
FIG. 2 diagrammatically depicts the structure of a joint.

FIG. 2 diagrammatically depicts a joint 4 which has an outer part 6, an inner part 7, a plurality of rolling bodies 3 and the cage 1 according to the invention. The force is transmitted via the shaft 9 and the toothing 15 illustrated towards the inner part 7 onto the rolling bodies 3. The rolling bodies 3 are guided in tracks or guideways 16 of inner part 7 and outer part 6, so that the torque is transmitted via the rolling bodies 3 from the inner part 7 to the outer part 6. The cage 1 is used to fix the rolling bodies 3 in the direction of an axis 15. The force acting on the cage 1 in the direction of the axis 15 becomes significantly greater if the shaft 9 transmits the torque at an inclination angle 8 with respect to the axis 19. Then, the guide forces which have to be absorbed in the axial direction for the cage 1 are particularly high.

Figure 3:
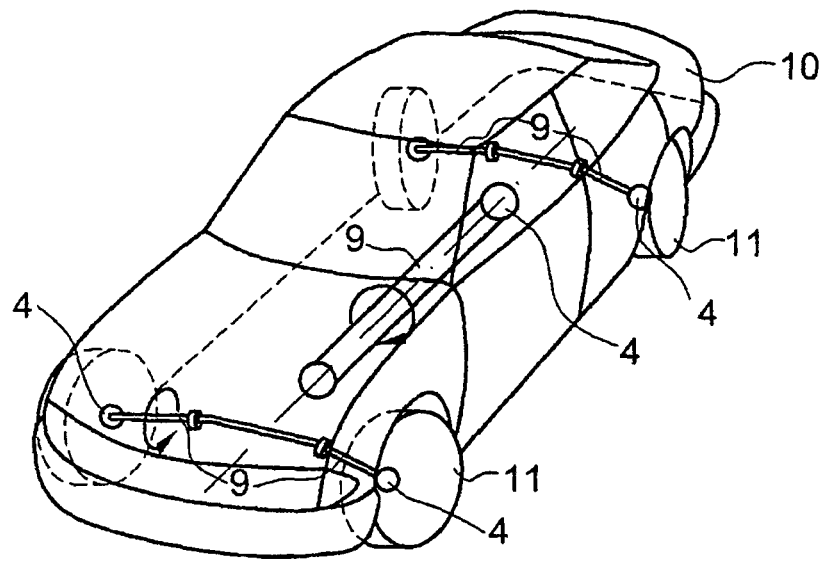
FIG. 3 shows a perspective illustration of a vehicle with a plurality of joints.

FIG. 3 diagrammatically depicts a vehicle 10 having a drive system for transmitting the torques generated in the engine to the wheels 11. A multiplicity of different shafts 9, which are connected to one another by joints 4, are used for this purpose. The joint 4 according to the invention is used in particular for the joints 4 which are provided for torque transmission near to the wheels 11.

Figure 4:
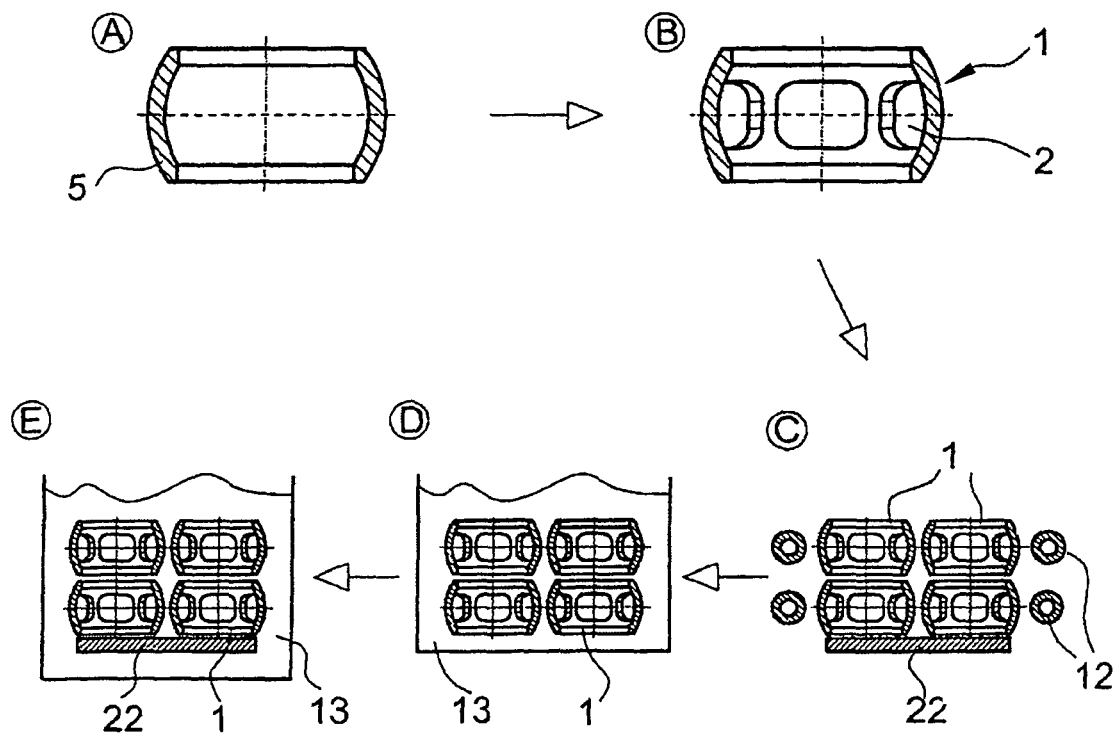
FIG. 4 diagrammtically depicts the sequence of a variant embodiment of the production process.

FIG. 4 diagrammatically depicts the production of a cage 1 of this type from a base body 5. In a first step (A), the base body 5 is formed. Then, the cutouts 2 are punched out (B), so that the cage 1 by now is substantially in its required external configuration. In the variant illustrated here, the heat treatment of the cages 1 is carried out batchwise and outside the individual production line, i.e. in each case a plurality of cages 1 are first of all collected, then grouped together and finally are simultaneously heated, quenched and tempered. Therefore, the cages 1 are jointly positioned on a base and fully hardened; the contact with a heating element 12 is illustrated by way of example here (C). The heating elements 12 are in this case designed as a continuous furnace with inductor loops, through which a multiplicity of cages 1 are moved (for example by means of a conveyor belt 22). Then, the cages 1 are quenched (D), quenching in the bath 13 being preferred in this instance. To achieve a uniform ductility of the cages 1, the cages are also tempered (D), which in this case is likewise carried out by means of immersion in a bath 13 containing oil. In this process, it is preferable for a large number of cages 1 to be brought together as batches (for example of up to 1000 cages) and heat-treated together. In particular when using such large batches, it should be taken into account that the quenching power is reduced when using common quenching in an oil bath. In particular in this situation, the steel described in the introduction, bearing the designation 45B2M, ensures a more uniform result at least with regard to the ductility property than, for example, steel bearing the designation Ck 45.

Figure 5:
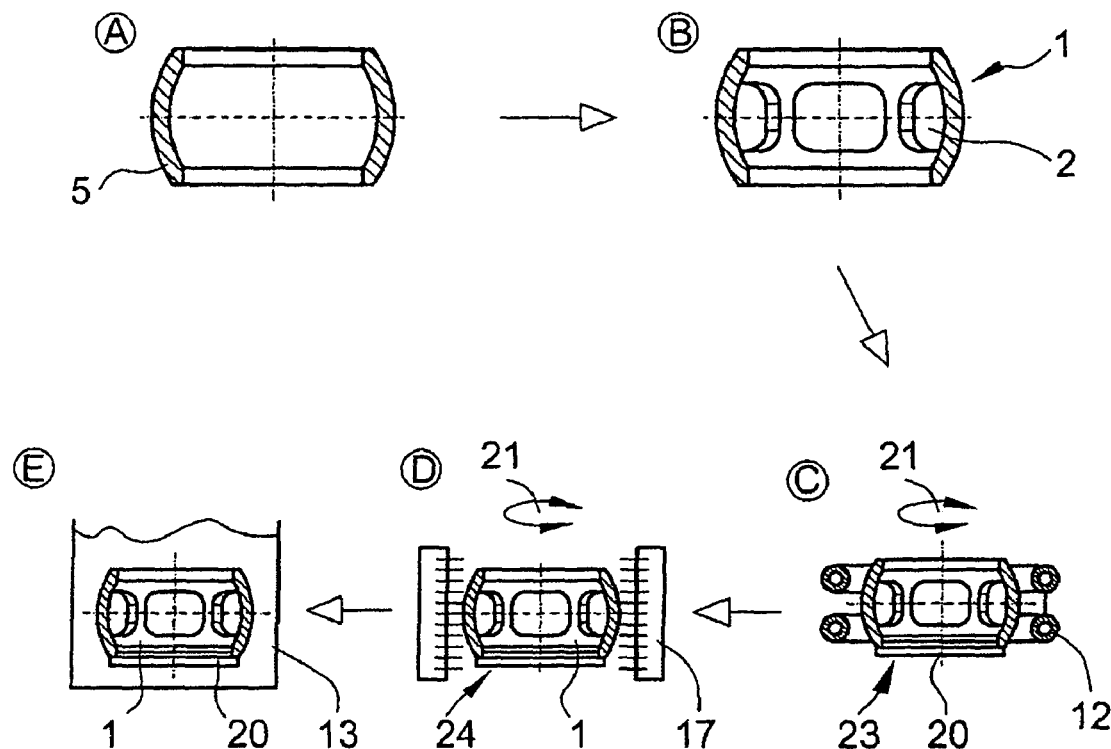
FIG. 5 diagrammatically depicts the sequence of a further variant embodiment of the production process.

Next, FIG. 5 diagrammatically depicts the sequence of a production process for an individual heat treatment of the cages 1 which is integrated in the production line. Steps (A) and (B) substantially correspond to those shown in FIG. 4. These steps are now followed by a heat treatment of each individual cage 1 in a hardening station 23, a quenching station 24 and a tempering station 25. At a hardening station 23 of this type, the cage 1 is positioned with respect to, for example, annular heating elements 12 (such as inductor loops) by means of a base 20 and is at least partially moved with respect to the heating elements 12 during the heat treatment by means of a relative movement 21, which is illustrated in the form of a rotation in FIG. 5 (C). When the desired hardening temperature has been reached, the cage 1 together with the base 20 is transported to the quenching station 24. The quenching station 24 in FIG. 6 comprises a delivery unit 17 for delivering coolant 18; in the illustration shown, the delivery unit 17 is designed in the form of a shower (D). During quenching too, a relative movement 21 between cage 1 and delivery unit 17 can be realized at least from time to time. With regard to the relative movements 21 during these heat treatments, it should also be mentioned that the movement can be carried out both by the cage 1 and/or at least one heating element 12 and/or at least one delivery unit 17 for delivering coolant 18. Finally, the cage 1 is also tempered in a bath 13 (E).

The use of fully hardened or quenched and tempered cages in joints in the automotive industry leads to a considerable increase in the static breaking strength even in the event of high degrees of inclination, so that in particular even the ever increasing torques as provided here can be transmitted in the long term. At the same time, the manufacturing process described for producing cages of this type allows simple integration in series production, since it is easy to integrate the heating and cooling. This allows conveyor means, staff, space and in particular also the hardening know-how required for case hardening to be reduced.

The invention claimed is:

1. A cage having a plurality of cutouts for receiving rolling bodies of a joint, wherein the cage comprises a quenched and tempered steel and the entire cage has a substantially uniform ductility over any cross section through the cage whereby the deviation of the hardness is less than 10% and the hardness is less than or equal to 650 HV.

2. The cage according to claim 1, wherein the cage has a hardness in a range from 500 to 650 HV.

3. The cage according to claim 1, wherein the cage comprises a steel with a carbon content in a range from 0.3% to 0.5%.

4. The cage according to claim 1, wherein the cage comprises a steel with at least boron as alloying element.

* * * * *